(12) United States Patent
Okajima et al.

(10) Patent No.: US 7,374,251 B2
(45) Date of Patent: May 20, 2008

(54) CONNECTION OF SPOKES TO HUB AND RIM IN BICYCLE WHEEL

(75) Inventors: Shinpei Okajima, Sakai (JP); Kazuki Koshiyama, Sakai (JP); Tsutomu Muraoka, Sakai (JP)

(73) Assignee: Shimano Inc., Osaka (JP)

( * ) Notice: Subject to any disclaimer, the term of this patent is extended or adjusted under 35 U.S.C. 154(b) by 267 days.

(21) Appl. No.: 11/253,795

(22) Filed: Oct. 20, 2005

(65) Prior Publication Data

US 2007/0090686 A1    Apr. 26, 2007

(51) Int. Cl.
*B60B 1/04*    (2006.01)
(52) U.S. Cl. ............................ 301/58; 301/59; 301/104
(58) Field of Classification Search .................. 301/55, 301/58, 59, 62, 74, 80, 104, 110.5
See application file for complete search history.

(56) References Cited

U.S. PATENT DOCUMENTS

| 286,476 | A | * | 10/1883 | Notley | 301/59 |
| 298,632 | A | * | 5/1884 | Smith | 152/5 |
| 478,394 | A | | 7/1892 | Bretz | |
| 672,747 | A | * | 4/1901 | Wheeler | 301/58 |
| 915,093 | A | * | 3/1909 | Garst | 301/67 |
| 5,626,401 | A | * | 5/1997 | Terry et al. | 301/59 |
| 5,882,088 | A | | 3/1999 | Yahata | |
| 6,010,197 | A | * | 1/2000 | Crosnier et al. | 301/59 |
| 6,371,252 | B1 | | 4/2002 | Kanehisa | |
| 2005/0067881 | A1 | | 3/2005 | Schlanger | |
| 2007/0057566 | A1 | * | 3/2007 | Cappellotto | 301/58 |

FOREIGN PATENT DOCUMENTS

| EP | 1 186 446 A2 | 3/2002 |
| JP | 6-219101 | * 8/1994 |

* cited by examiner

*Primary Examiner*—Russell D Stormer
(74) *Attorney, Agent, or Firm*—Global IP Counselors, LLP

(57) ABSTRACT

A bicycle hub has an axle and a hub shell rotatably disposed about the axle with a plurality of spoke fixing parts disposed at opposite ends of the hub shell. Each of the spoke fixing parts has a through hole having a small width section extending from a first side of a corresponding one of the spoke fixing parts and a large width section extending from a second side of the corresponding one of the spoke fixing parts such that an internal abutment is formed between the small and large width sections. The securing elements are removably disposed in the large width sections of the spoke fixing parts of the hub shell with each of the securing elements having a threaded bore that is aligned with and substantially equal to the small width sections of the spoke fixing parts of the hub shell.

20 Claims, 8 Drawing Sheets

CONNECTION OF SPOKES TO HUB AND RIM IN BICYCLE WHEEL

BACKGROUND OF THE INVENTION

1. Field of the Invention

This invention generally relates to a bicycle wheel component having at least hub of a bicycle wheel. More specifically, the present invention relates to a bicycle hub having tension spokes attached by securing elements to spoke attachment structures of the hub.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle wheel. Bicycle wheels are constantly being redesigned to be strong, lightweight and more aerodynamic in design as well as to be simple to manufacture and assemble.

There are many different types of bicycle wheels, which are currently available on the market. Most bicycle wheels have a hub, a plurality of spokes and an annular rim. The hub is attached to a part of the frame of the bicycle for relative rotation. The inner ends of the spokes are coupled to the hub and extend outwardly from the hub. The annular rim is coupled to the outer ends of the spokes and has an outer portion for supporting a pneumatic tire thereon. Typically, the spokes of the bicycle wheel are thin metal wire spokes. The ends of the hub are usually provided with flanges that are used to couple the spokes to the hub. In particular, holes are provided in the hub flanges. The wire spokes are usually bent on their inner end and provided with a flange that is formed in the shape of a nail head. The inner end is supported in one of the holes in one of the hub flanges. The outer ends of the spokes typically are provided with threads for engaging spoke nipples, which secure the outer ends of the wire spokes to holes in the rim.

Recently, bicycle wheels have been designed that use straight spokes. Since straight spokes do not have a bent nail head, the hub needs to be designed with special attachment structures for securing the inner end to the hub shell or body. Some of the hubs that are used with straight spokes can be expensive and/or complicated to manufacture due to the special attachment structures for securing the inner end to the hub shell or body. In addition, the special attachment structures sometimes causes the lateral spacing between the left side spokes and the right side spokes to be reduced, which can reduce the rigidity of the wheel in the lateral direction. Moreover, these types of wheels are not always as lightweight, as desired, due to these special attachment structures. Furthermore, with these types of wheels it can be difficult, complicated and/or expensive to replace a spoke or spokes.

In view of the above, it will be apparent to those skilled in the art from this disclosure that there exists a need for an improved bicycle component that includes a bicycle hub. This invention addresses this need in the art as well as other needs, which will become apparent to those skilled in the art from this disclosure.

SUMMARY OF THE INVENTION

One object of the present invention is to provide a bicycle component that includes a bicycle hub that is relatively strong yet relatively lightweight.

Another object of the present invention is to provide bicycle component that includes a bicycle hub that is relatively simple and inexpensive to manufacture and assemble.

The foregoing objects can basically be attained by providing a bicycle component comprising an axle, a hub shell and a plurality of securing elements. The hub shell is rotatably disposed about the axle with a plurality of spoke fixing parts disposed at opposite ends of the hub shell. Each of the spoke fixing parts includes a through hole having a small width section extending from a first side of a corresponding one of the spoke fixing parts and a large width section extending from a second side of the corresponding one of the spoke fixing parts such that an internal abutment is formed between the small and large width sections. The securing elements are removably disposed in the large width sections of the spoke fixing parts of the hub shell with each of the securing elements having a threaded bore that is aligned with and substantially equal to the small width sections of the spoke fixing parts of the hub shell. The securing elements are configured and arranged such that they do not extend into the small width sections of the spoke fixing parts.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
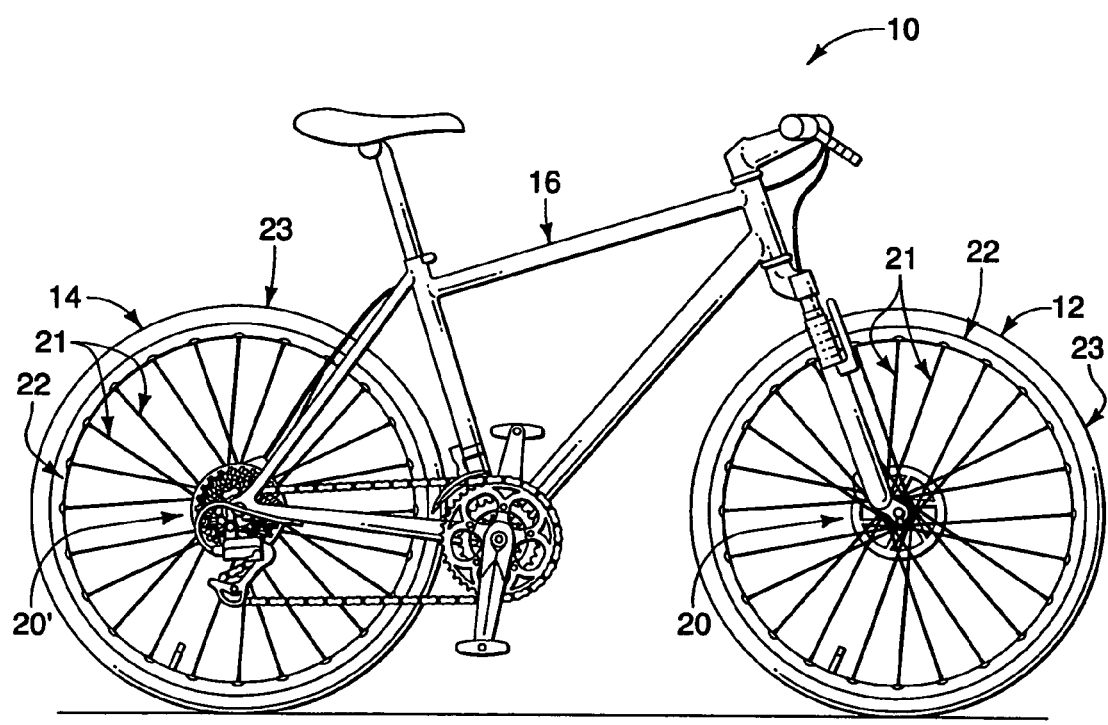
FIG. 1 is a side elevational view of a bicycle with a front bicycle wheel having a rim, a plurality of spokes and a front bicycle hub that constitutes a front bicycle component in accordance with a first embodiment of the present invention.

Referring initially to FIG. 1, a bicycle 10 is illustrated with a front bicycle wheel 12 and a rear bicycle wheel 14 in accordance with a first embodiment of the present invention. The bicycle wheels 12 and 14 are attached to a bicycle frame 16 in a conventional manner. Since the parts of the bicycle 10 are well known in the art, the parts of the bicycle 10 will not be discussed or illustrated in detail herein, except for the parts that relate to the present invention. In other words, only the parts related to the bicycle wheels 12 and 14 will be discussed and illustrated in detail herein. Moreover, various conventional bicycle parts such as brakes, additional sprockets, derailleurs, etc., which may or may not be illustrated herein, can be used in conjunction with the present invention.

Generally, the present invention is applied in the same manner to both of the bicycle wheels 12 and 14. Also some of the parts of the bicycle wheels 12 and 14 are identical or have the same function. Thus, the identical parts of the bicycle wheels 12 and 14 will be given the same reference numerals. The front bicycle wheel 12 basically includes a center hub 20, a plurality of spokes 21, and an annular rim 22 with a pneumatic tire 23. Similarly, the rear bicycle wheel 14 basically includes a center hub 20' that has a plurality of the spokes 21 attached thereto, and the annular rim 22 with the pneumatic tire 23 disposed on the outer ends of the spokes 21. The only significant difference between the front bicycle wheel 12 and the rear bicycle wheel 14 is that the hub 20' of the rear bicycle wheel 14 is configured to support a plurality of sprockets, and dished its rim 22 relative to its hub 20'. Thus, only the front bicycle wheel 12 will be discussed and illustrated in detail herein.

Figure 2:
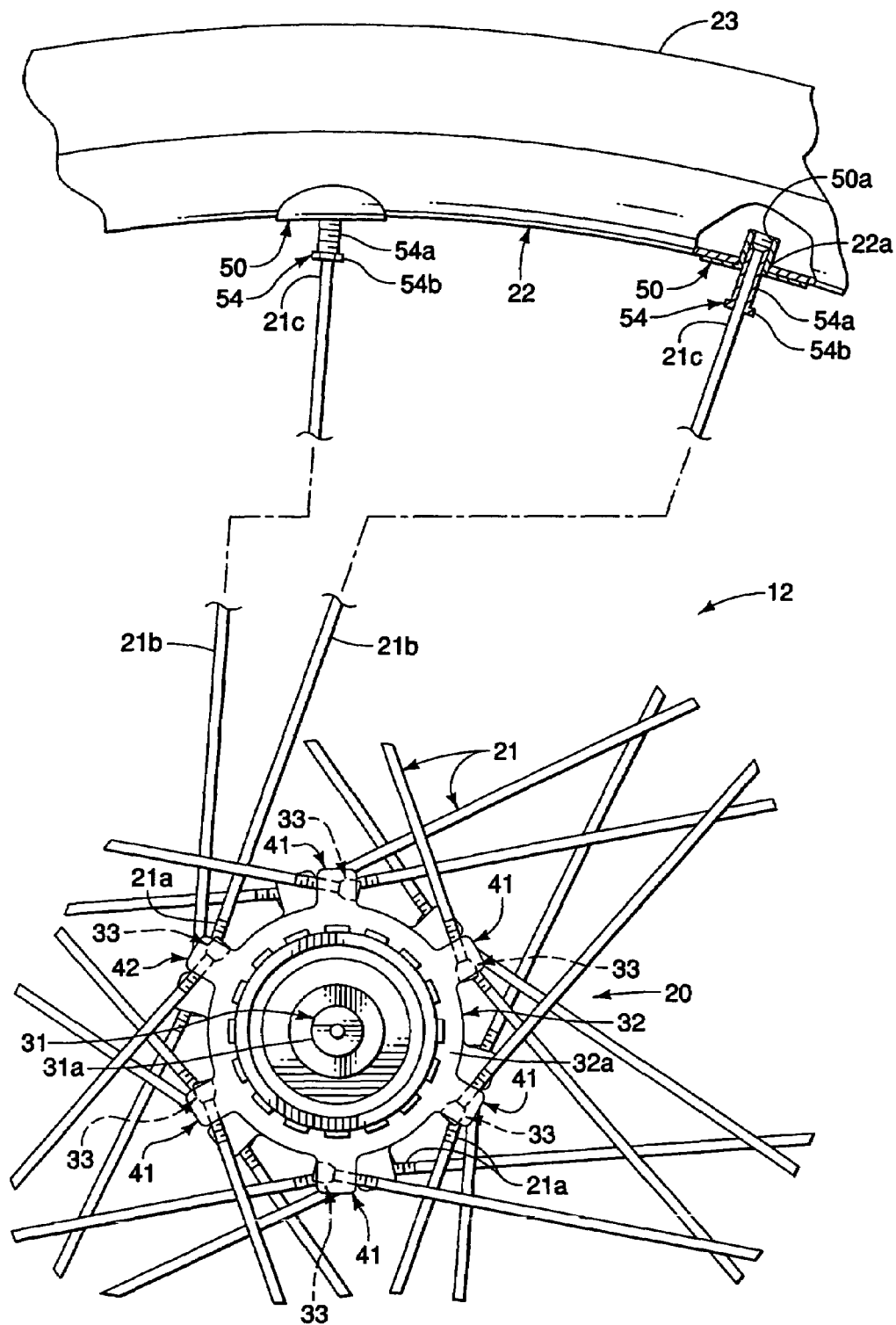
FIG. 2 is a partial side elevational view of the front bicycle component (the rim, the hub and the spokes) illustrated in FIG. 1 in accordance with the first embodiment of the present invention.

Referring now to FIG. 2, the front bicycle wheel 12 basically includes a center hub 20, a plurality of spokes 21, and an annular rim 22 with a pneumatic tire 23. The spokes 21 are tension spokes that interconnect the hub 20 and the rim 22 together as explained below. The tire 23 can include a tire and tube type, or can be a tubeless tire type, as needed and/or desired. In the illustrated embodiment, the front bicycle wheel 12 includes twenty-four of the spokes 21 that extend generally tangentially from the hub 20 to the rim 22. Also, in the illustrated embodiment, the spokes 21 are coupled to the rim 22 at equally spaced circumferential locations as seen in FIG. 1. Of course, it will be apparent to those skilled in the art from this disclosure that the front bicycle wheel 12 could use a modified rim and/or hub in order to accommodate different spoking arrangements without departing from the scope of the present invention. Moreover, it will be apparent to those skilled in the art from this disclosure that the front bicycle wheel 12 could use a modified rim and/or hub in order to accommodate fewer or more spokes 21 if needed and/or desired. In any case, the spokes 21 are preferably coupled to the annular rim 22 in circumferentially spaced arrangement.

Referring now to FIGS. 2-5, first, the spokes 21 will be discussed in more detail. The spokes 21 are preferably straight spokes that are identical to each other. Each of the spokes 21 basically includes a threaded inner end portion 21a, a straight center or a middle portion 21b and an outer headed end portion 21c. The portions 21a, 21b and 21c of each of the spokes 21 are preferably integrally formed together as a one piece, unitary member. The threaded inner end portions 21a of the spokes 16 are coupled to the hub 20, while the outer end portions 21c of the spokes 21 are coupled to the rim 22, as explained below. The spokes 21 are preferably wire-type spokes that are relatively conventional. Thus, the spokes 21 will not be discussed and/or illustrated in detail herein, except as related to the hub 20 of the present invention.

Figure 4:
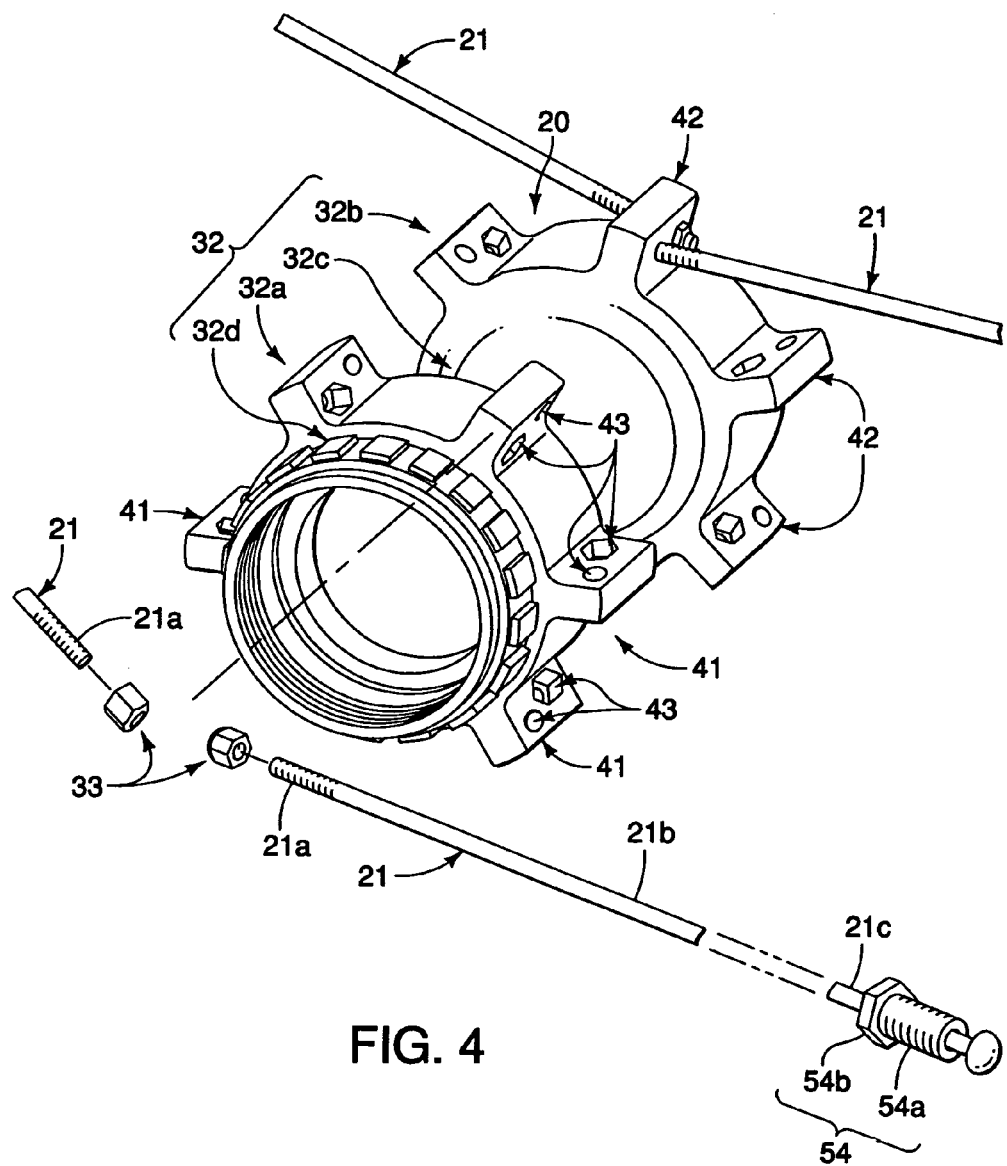
FIG. 4 is an exploded partial perspective view of selected parts of the front bicycle component illustrated in FIGS. 1-3 that illustrates the bicycle hub and some of the spokes of the front bicycle component in accordance with the first embodiment of the present invention.
Figure 5:
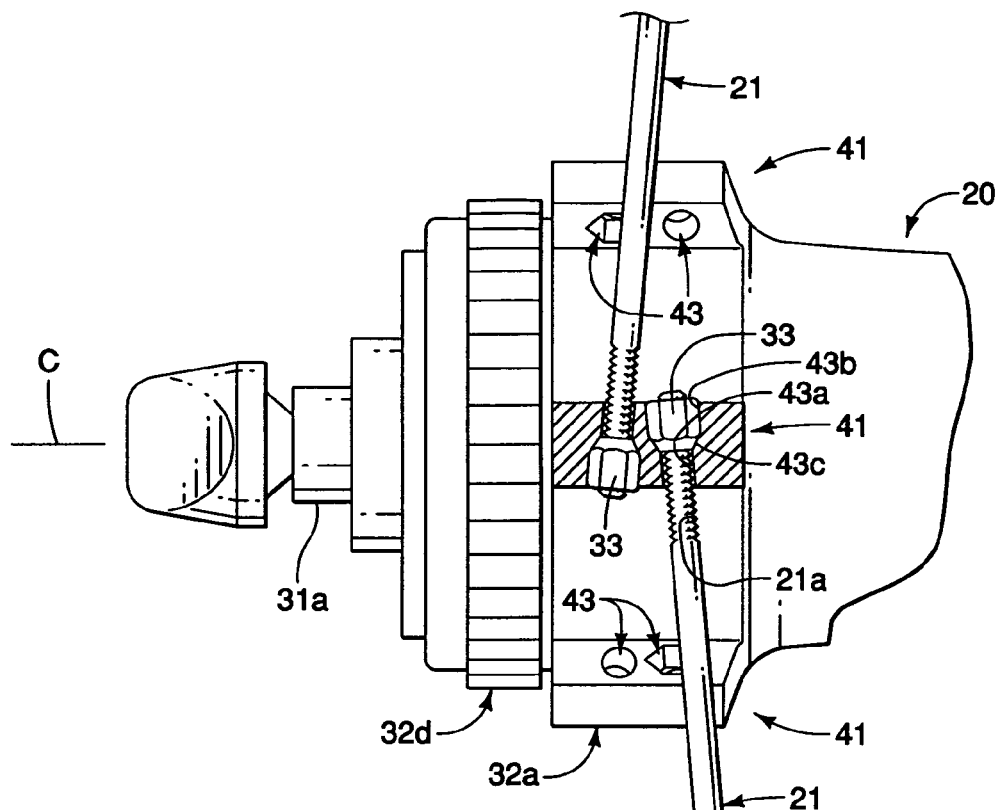
FIG. 5 is an enlarged partial front elevational view of a right side portion of the front bicycle component (the hub and a pair of spokes) illustrated in FIGS. 1-4 with a section of one of the spoke fixing parts being broken away for purposes of illustration.

Referring to FIGS. 4 and 5, the hub 20 will now be discussed in more detail. The hub 20 basically includes an axle 31 with a hub shell or body 32 disposed about the axle 31 in a rotatable manner by a pair of bearings in a conventional manner. The hub 20 further includes a plurality of spoke securing elements 33 for securing the spokes 21. The other parts of the hub 20, other than the hub shell or body 32 and the spoke securing elements 33, are relatively conventional. Thus, these other parts of the hub 20 will not be discussed or illustrated in detail herein.

The axle 31 is a hard rigid member that has a pair of opposite free ends 31a and 31b extending outwardly from the hub shell 32. The free ends 31a and 31b of the axle 31 are fixedly coupled the frame 16 via a quick release device 34 in a conventional manner. The axle 31 has a center axis C that defines the center axis of the wheel 12.

As best seen in FIG. 4, the hub shell 32 is a hard rigid tubular member that is rotatably supported on the axle 31. The hub shell 32 includes a first spoke mounting portion 32a, a second spoke mounting portion 32b and a tubular center portion 32c disposed between the mounting portions 32a and 32b. Thus, the spoke mounting portions 32a and 32b are disposed at opposite ends of the hub shell 32. The spoke mounting portions 32a and 32b are configured and arranged to fixedly secure the spokes 21 thereto. The spoke mounting portions 32a and 32b are preferably mirror images of each other as shown, except that the spoke mounting portion 32a is circumferentially offset from the spoke mounting portion 32b. Of course, the spoke mounting portions 32a and 32b do not need to be mirror images of each other if needed and/or desired. Optionally, the hub shell 32 is also provided with a brake mounting portion 32d for attaching a disc brake rotor (not shown). The optional disc brake rotor (not shown) can be attached to the hub shell 32 by a retaining or locking ring that is threaded into on the end of the hub shell 32 such as disclosed in U.S. Pat. No. 6,371,252 to Kanehisa (Assigned to Shimano, Inc.).

The spoke mounting portion 32a includes a plurality (six) of individual spoke fixing parts or protrusions 41 that extend outwardly in a radial manner from one end of the hub shell 32. The spoke fixing parts 41 are equally spaced apart in a circumferential direction around the main body of the spoke mounting portion 32a. Each of the spoke fixing parts 41 is configured and arranged to fix a pair of the spokes 21 thereto using two of the spoke securing elements 33. Each of the spoke fixing parts 41 is preferably identical as shown. Of course, the spoke fixing parts 41 do not need to be identical if needed and/or desired.

Figure 3:
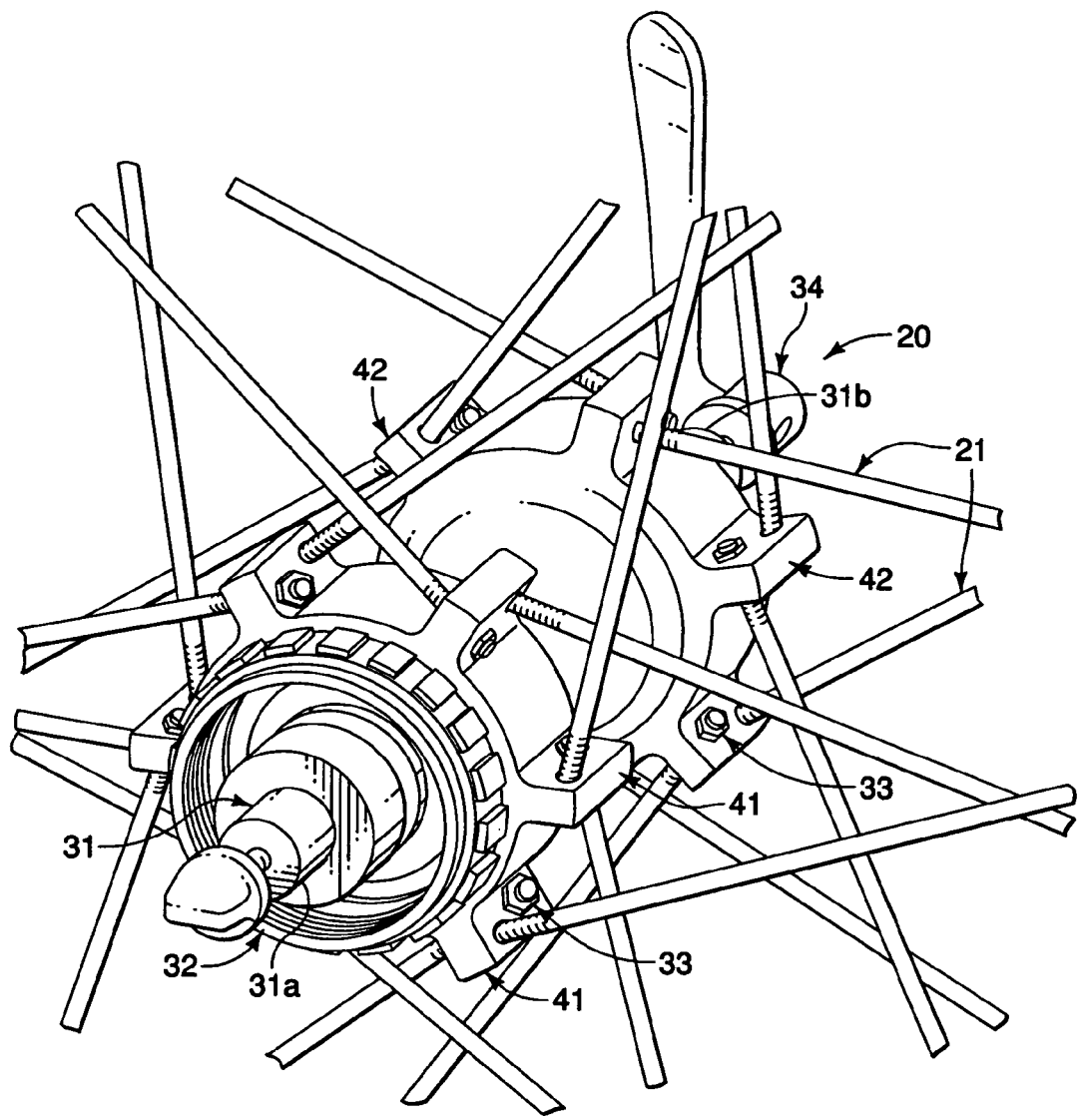
FIG. 3 is an enlarged partial perspective view of the front bicycle component (the hub and the spokes) illustrated in FIGS. 1 and 2 in accordance with the first embodiment of the present invention.

Likewise, the mounting portion 32b includes a plurality (six) of individual spoke fixing parts or protrusions 42 that extend outwardly in a radial manner from one end of the hub shell 32. The spoke fixing parts 42 are equally spaced apart in a circumferential direction around the main body of the spoke mounting portion 32b. The spoke fixing parts 42 are preferably offset mirror images of the spoke fixing parts 41. In other words, the spoke fixing parts 42 are circumferentially offset from the spoke fixing parts 41 by an acute angle such as 15° and face in the opposite axial direction from the spoke fixing parts 41 as seen in FIGS. 2 and 3.

Each of the spoke fixing parts 42 is configured and arranged to fix a pair of the spokes 21 thereto using two of the spoke securing elements 33. Each of the spoke fixing parts 42 is preferably identical as shown. Of course, the spoke fixing parts 42 do not need to be identical if needed and/or desired.

Thus, the spoke fixing parts or protrusions 41 and 42 of the hub shell 32 are individual radial projections that are circumferentially spaced apart about opposite ends of the hub shell 32. Since the spoke fixing parts 41 and 42 are identically configured and dimensioned, except for orientation, only the spoke fixing parts 41 on the spoke mounting portion 32a of hub shell 32 will be discussed and/or illustrated in detail.

Figure 6:
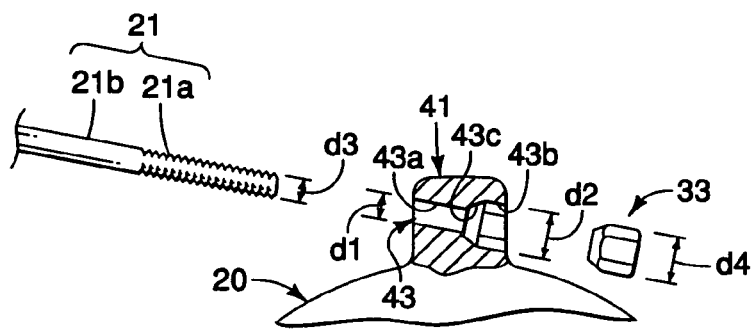
FIG. 6 is a partial side elevational view of the front bicycle component illustrated in FIGS. 1-5 in accordance with the first embodiment of the present invention.

As best seen in FIGS. 5 and 6, each of the spoke fixing parts 41 of the hub shell 32 has a pair of through holes 43 for attaching a pair of the spokes 21 thereto using two of the spoke securing elements 33. More specifically, the through holes 43 have center axes that extend outwardly so as to form an obtuse angle (e.g., 159°) therebetween. The through holes 43 are also slanted or angle relative to each other to with one of the through holes 43 forming an angle of about 7° 30' with respect to a plane that extends perpendicular to the center longitudinal axis of the hub shell 32 and the other through holes 43 forming an angle of about 8° 30' with respect to a plane that extends perpendicular to the center longitudinal axis of the hub shell 32. The different angles of the center axes of the through holes 43 avoid interference between crossing pairs of the spokes 21.

Each of the through holes 43 includes a small width section 43a extending from a first side of a corresponding one of the spoke fixing parts 41 and a large width section 43b extending from a second side of the corresponding one of the spoke fixing parts 41. In the illustrated embodiment, a transition section 43c is formed in each of the through holes 43 between the small width section 43a and the large width section 43b.

The small width section 43a is dimensioned to receive one of the inner ends 21a of one of the spokes 21. The large width section 43b is dimensioned to receive one of the securing elements 33. More specifically, the small width section 43a has a maximum diameter or width d1, which the large width section 43b has a maximum diameter or width d2 that is larger than the diameter or width d1 of the small width section 43a. Thus, the transition section 43c forms an internal abutment between the small width section 43a and the large width section 43b. The diameter d1 of the small width section 43a is substantially identical (slightly larger) to a diameter d3 of the threads of the threaded inner end portion 21a. The width d2 of the large width section 43b is substantially identical (slightly larger) to a width d4 of the securing elements 33. In this embodiment, the large width section 43b has a non-circular shape in a transverse cross section.

When conventional spokes are used, the threads of the threaded inner end portion 21a have a major diameter of 2.27 millimeters and a minor diameter of 1.87 millimeters. Thus, the diameter d3 is equal to 2.27 millimeters and the diameter d1 of the small width section 43a is equal to at least 2.27 millimeters. Preferably, the diameter d1 of the small width section 43a is the smaller than 4.0 millimeters (i.e., the outer diameter of a conventional spoke nipple shaft), and more preferably lies within the range of 2.27 millimeters to 2.50 millimeters.

The width d2 of the large width section 43b is preferably equal to about 3.50 millimeters or smaller. Thus, when the diameter d1 of the small width section 43a is within the range of 2.27 millimeters to 2.50 millimeters, the abutment surface formed by the transition section 43c has a radial width of at least 1.00 millimeters and more preferably a radial width of about 1.20 millimeters. The conventional spoke nipple head has a diameter of about 5.0 millimeters to about 6.0 millimeters. By forming the through holes 43 of the spoke fixing parts 41 with these dimensional relationships, the axial width of the each of the spoke fixing parts 41 of the hub shell 32 can be made smaller without decreasing the strength of the spoke fixing parts 41 of the hub shell 32. In other words, the weight of the hub shell 32 can be reduced and the minimum axial width between the right and left side spokes 21 can be increased while not decreasing the strength of the spoke fixing parts 41 of the hub shell 32.

Figure 7:
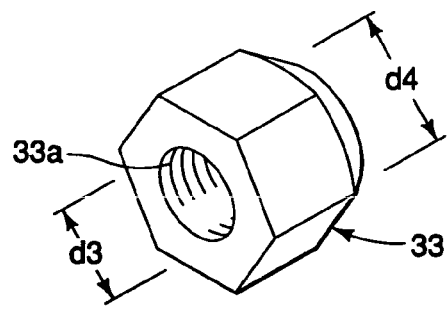
FIG. 7 is a perspective view of one of the securing elements of the front bicycle component illustrated in FIGS. 1-6 in accordance with the first embodiment of the present invention.

As seen in FIGS. 5 and 6, the securing elements 33 are basically nuts that are removably coupled to the spoke fixing parts 41 and 42 of the hub shell 32. In particular, the securing elements 33 are dimensioned to be inserted axially into the large width section 43b of the through holes 43 with one of the spokes 21 coupled thereto. Also the securing elements 33 are configured and arranged such that they do not extend into the small width sections 43a of the spoke fixing parts 41. As best seen in FIG. 7, each of the securing elements 33 has a threaded bore 33a to attach the threaded inner end portion 21a of one of the spokes 21 to the hub shell 32. The threaded bore 33a has the same diameter (d3) as the threaded inner end portion 21a of one of the spokes 21. As mentioned above, the securing element 33 have a width d4 that is substantially identical (slightly smaller) to the width d2 of the large width section 43b of the through holes 43. In this embodiment, the securing elements 33 have non-circular, transverse cross section shapes. Thus, the securing elements 33 are removably disposed in the large width sections 43b of the spoke fixing parts 41 of the hub shell 32 with each of the securing elements 33 having its threaded bore 33a axially aligned with the center axis of the through holes 43 when installed therein.

Turning now to the description of the rim 22 as seen in FIGS. 1 and 2, the rim 22 is an annular member designed for rotation about the center axis C of the hub axle 31. The rim 22 is constructed of a substantially rigid material, such as those materials, which are well known in the art. For example, the rim 22 can be constructed of any suitable metallic material, such as plated steel, stainless steel, aluminum, magnesium or titanium, as well as other non-metallic materials, such as a carbon fiber composite. Preferably, the rim 22 is constructed of aluminum. The construction of the rim 22 will now be discussed in more detail below.

The rim 22 is substantially circular as seen in side elevation (FIG. 1). Basically, the rim 22 has a uniform cross-sectional profile, except for the absence of material for accommodating an air filling valve and attachment of the spokes. As seen in FIG. 2, the rim 22 basically has twenty-four of the attachment openings 22a (only one shown) in order to attach a total of twenty-four spokes 21. Preferably, the attachment openings 22a are circumferentially equally spaced apart in the circumferential direction from each other as best understood from FIG. 1. Alternating ones of the attachment openings 22a are preferably slightly angled in opposite axial directions relative to a rim center plane so that the spokes 21 coupled thereto extend to opposite ends of the hub 20. Preferably, the spokes 21 are coupled between the hub 20 and the rim 22 so that the wheel 12 is dished, i.e., the rim 22 is offset from the center of the hub 22 towards the end of the hub shell 32 that has the brake mounting portion 32d. Each of the attachment openings 22a is configured to receive a tubular part of one of a plurality of reinforcement members 50 therein as seen in FIG. 2.

The reinforcement members 50 are bonded to an inner portion of the rim 22 by welding, brazing, adhesive or the like. The reinforcement members 50 are preferably formed as separate aluminum members from the rim 22 by casting, machining and/or any other suitable manufacturing technique. The reinforcement members 50 are fixedly coupled to the rim 22 of the rim 22 in order to reinforce the rim 22. The reinforcement members 50 are preferably identical members that are welded to the exterior surface of the spoke attachment portion 52 in order to permanently secure the reinforcement members 50 thereto. Each reinforcement member 50 is preferably constructed as a one-piece unitary member from a lightweight, rigid metallic material. Specifically, each reinforcement member 50 is preferably constructed of aluminum, as mentioned above. In any case, the reinforcement members 50 are preferably constructed of the same material as the rim 22, and are permanently bonded thereto to reinforce the rim 22. The reinforcement members 50 effectively increase the thickness of the rim 22 at the attachment openings 22a to provide rigid reinforcement to the rim 22. In this embodiment, each of the reinforcement members 50 has a substantially inverted mushroom shape as best shown in FIG. 2. Specifically, each of the reinforcement members 50 has a threaded opening 50a in order to threadedly couple one of the spokes 21 thereto by an adapter 54. The adapters 54 are tubes with externally threads 54a and a non circular (e.g., rectangularly shaped, hexagonally shaped, longitudinally splined, etc) tool engaging portion 54b. The adapters 54 are mounted on the shafts of the spokes 21 such that one end of the adapter 54 engages the head portion 21c of one of the spokes 21. The external threads 54a of the adapters 54 are configured to mate with the internal threads 50a of the reinforcement members 50. Thus, the spokes 21 can be adjustably, releasably and fixedly coupled to the rim 22 via the adapters 54. Thus, the tension in the spokes 21 is adjusted by tightening or loosening the adapters 54.

Second Embodiment

Figure 8:
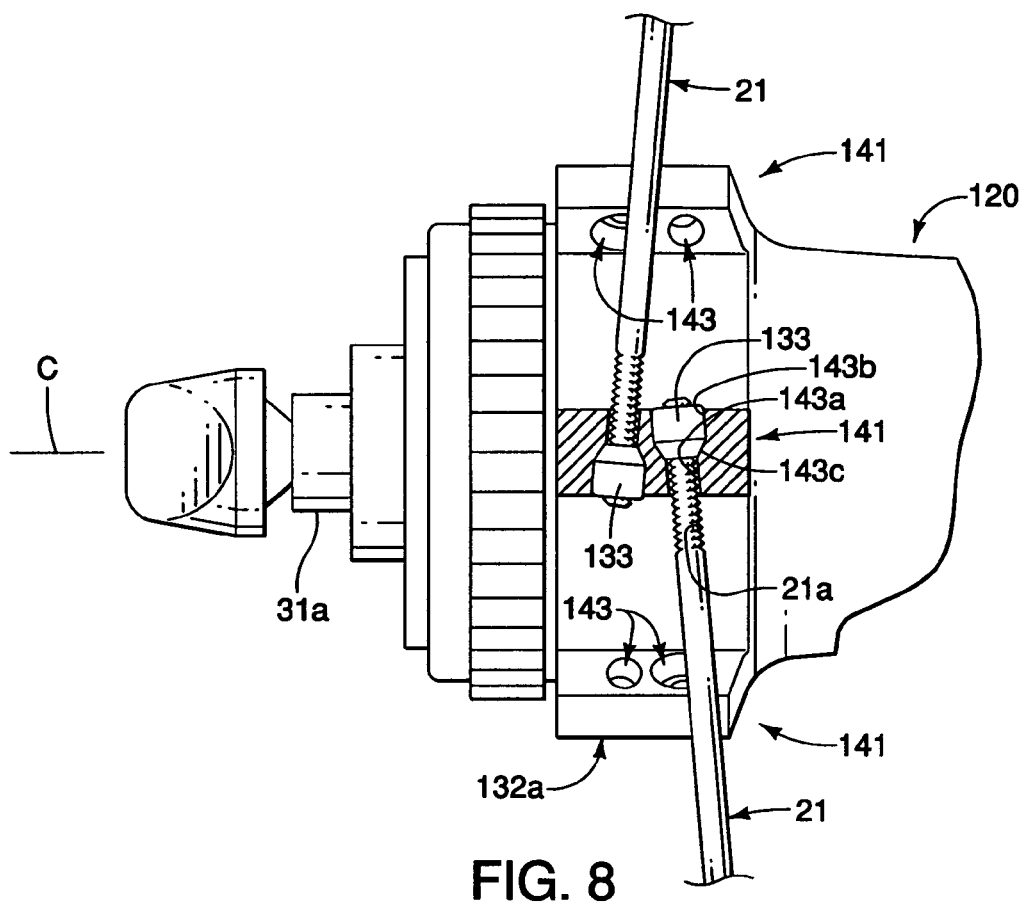
FIG. 8 is an enlarged partial front elevational view of a right side portion of a front bicycle component (a hub and a pair of spokes) with a section of one of the spoke fixing parts being broken away for purposes of illustration in accordance with a second embodiment of the present invention.
Figure 9:
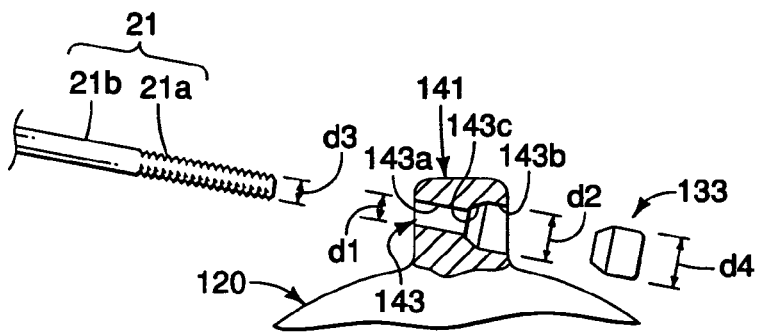
FIG. 9 is a partial side elevational view of the front bicycle component illustrated in FIG. 8 in accordance with the second embodiment of the present invention.
Figure 10:
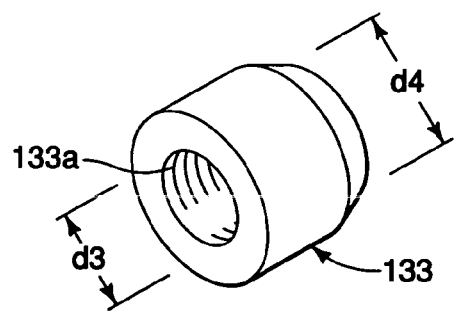
FIG. 10 is a perspective view of one of the securing elements of the front bicycle component illustrated in FIGS. 8 and 9 in accordance with the second embodiment of the present invention.

Referring now to FIGS. 8-10, a portion of a modified front hub 120 is illustrated in accordance with a second embodiment of the present invention. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. In other words, unless otherwise specified, the configuration of the front wheel of the second embodiment is the same as the configuration of the first embodiment.

The front hub 120 is configured to be used with the spokes 21 and the rim 22 of the first embodiment. In this embodiment, the hub 120 has modified spoke fixing parts 141 with modified through holes 143 that receive modified spoke securing elements 133 to engage the threaded portions 21a of the spokes 21. The spoke fixing parts on other side of the hub 120 have the same arrangement. Thus, the only difference between the first and second embodiments is the shapes of the through holes 143 and the use of the modified spoke securing elements 133.

Similar to the first embodiment, the securing elements 133 are removably coupled to the spoke fixing parts 141 of mounting portions 132a (only one shown) of the hub shell 132. In particular, the securing elements 133 are dimensioned to be inserted axially into the through holes 143 of the spoke fixing parts 141. In this embodiment, the securing elements 133 have a circular transverse cross section at the section having its maximum width. Thus, the through holes 143 includes a small width section 143a extending from a first side of a corresponding one of the spoke fixing parts 141 and a large width section 143b extending from a second side of the corresponding one of the spoke fixing parts 141, with a transition section 143c is formed between the small width section 143a and the large width section 143b. The large width section 143b has a circular transverse cross section. The dimensions of this embodiment are the same as the first embodiment, except as shown otherwise.

Third Embodiment

Figure 11:
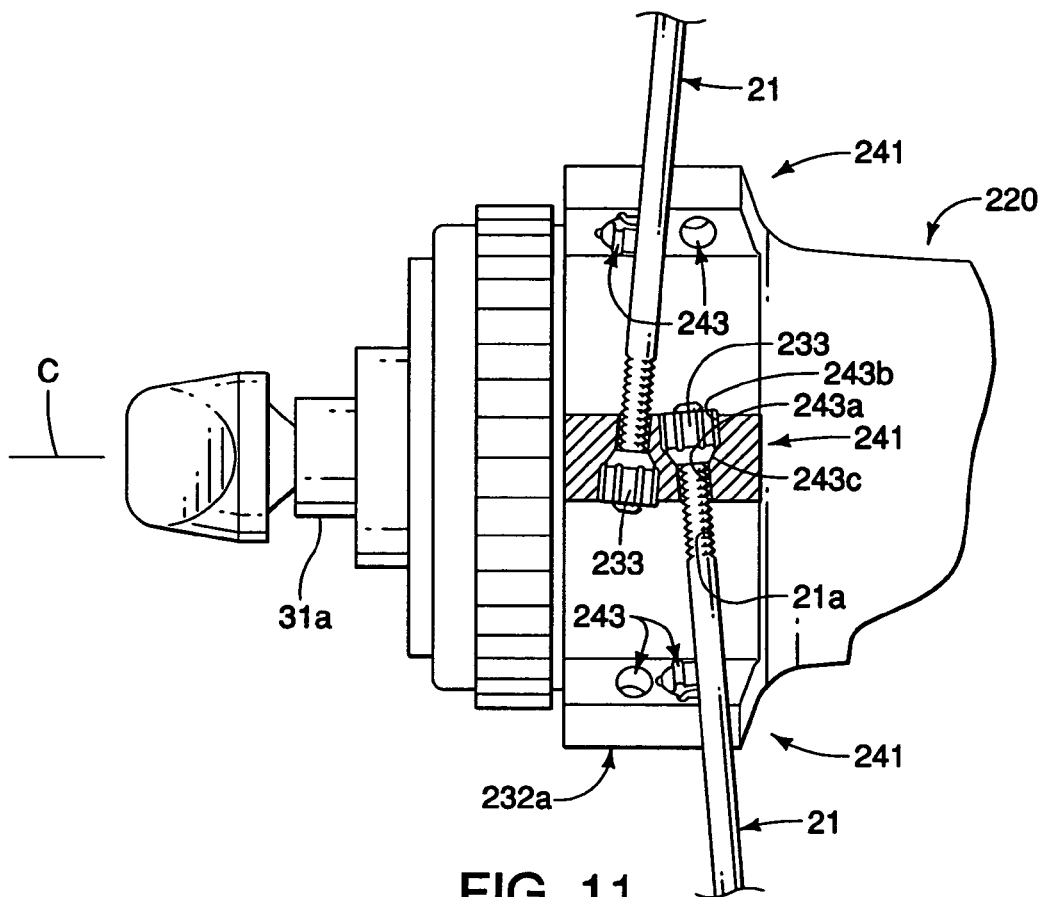
FIG. 11 is an enlarged partial front elevational view of a right side portion of a front bicycle component (a hub and a pair of spokes) with a section of one of the spoke fixing parts being broken away for purposes of illustration in accordance with a third embodiment of the present invention.
Figure 12:
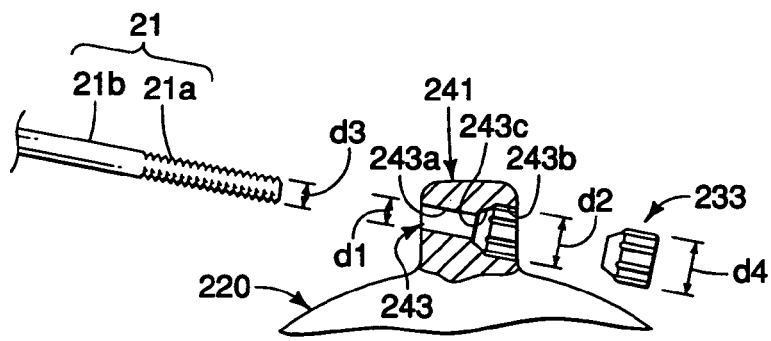
FIG. 12 is a partial side elevational view of the front bicycle component illustrated in FIG. 11 in accordance with the third embodiment of the present invention.
Figure 13:
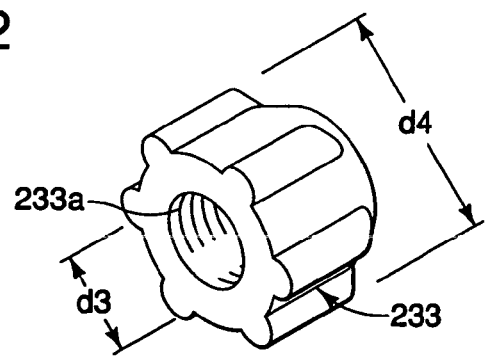
FIG. 13 is a perspective view of one of the securing elements of the front bicycle component illustrated in FIGS. 11 and 12 in accordance with the third embodiment of the present invention.
Figure 14:
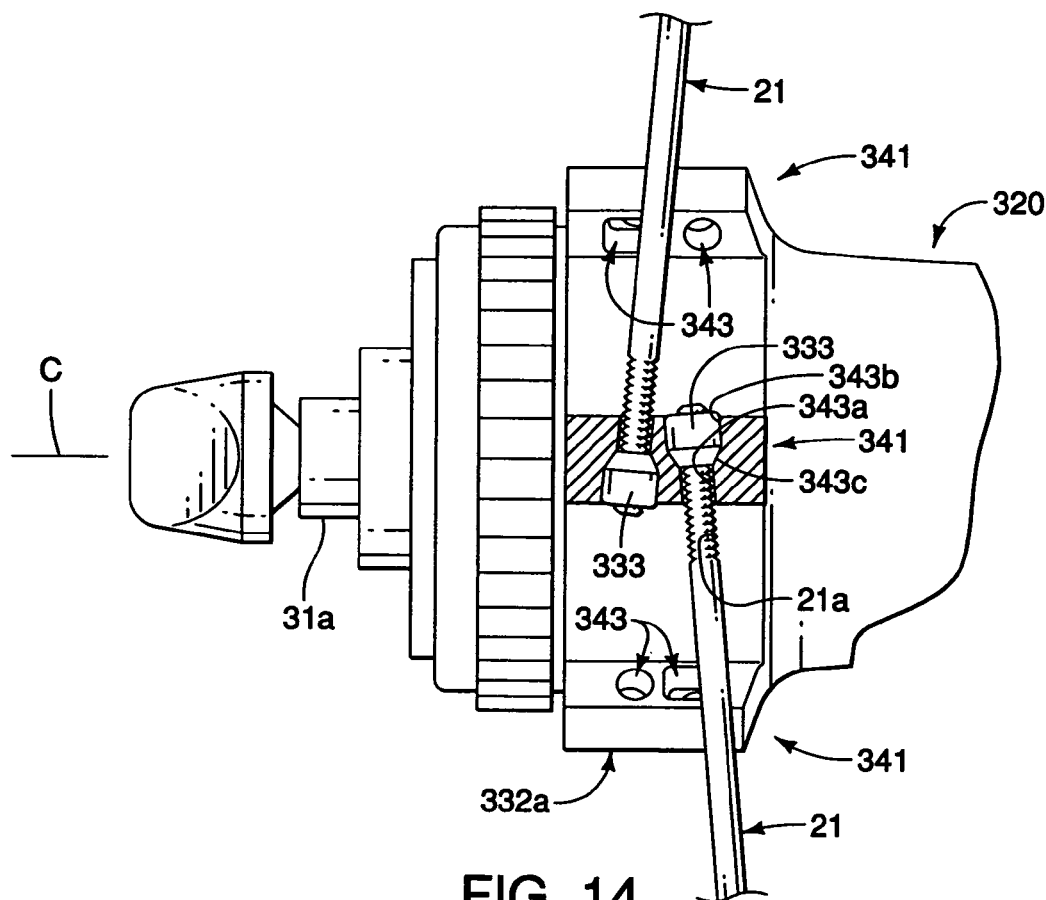
FIG. 14 is an enlarged partial front elevational view of a right side portion of a front bicycle component (a hub and a pair of spokes) with a section of one of the spoke fixing parts being broken away for purposes of illustration in accordance with a fourth embodiment of the present invention.
Figure 15:
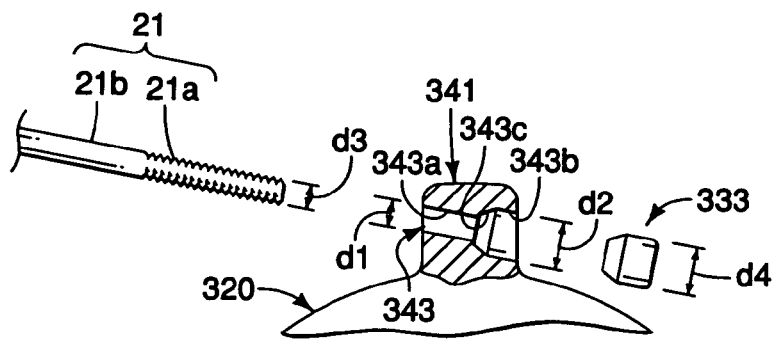
FIG. 15 is a partial side elevational view of the front bicycle component illustrated in FIG. 14 in accordance with the fourth embodiment of the present invention.
Figure 16:
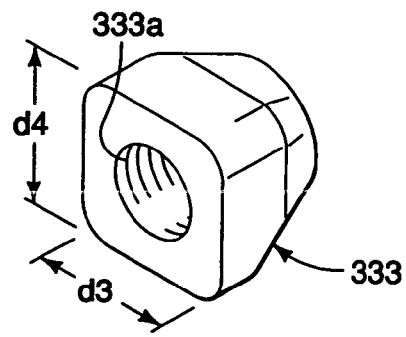
FIG. 16 is a perspective view of one of the securing elements of the front bicycle component illustrated in FIGS. 14 and 15 in accordance with the fourth embodiment of the present invention.

Referring now to FIGS. 11-13, a modified front hub 220 is illustrated in accordance with a third preferred embodiment. In view of the similarity between the third embodiment and the prior embodiments, the parts of the third embodiment that are identical to the parts of the prior embodiments will be given the same reference numerals as the parts of the prior embodiments. Moreover, the descriptions of the parts of the third embodiment that are identical to the parts of the prior embodiments may be omitted for the sake of brevity. In other words, unless otherwise specified, the configuration of the front wheel of the third embodiment is the same as the configuration of the first embodiment.

The front hub 220 is configured to be used with the spokes 21 and the rim 22 of the first embodiment. In this embodiment, the hub 220 has modified spoke fixing parts 241 with modified through holes 243 that receive modified spoke securing elements 233 to engage the threaded portions 21a of the spokes 21. The spoke fixing parts on other side of the hub 220 have the same arrangement. Thus, the only difference between the first and second embodiments is the shapes of the through holes 243 and the use of the modified spoke securing elements 233.

Similar to the first embodiment, the securing elements 233 are removably coupled to the spoke fixing parts 241 of mounting portions 232a (only one shown) of the hub shell 232. In particular, the securing elements 233 are dimensioned to be inserted axially into the through holes 243 of the spoke fixing parts 241. Thus, the through holes 243 includes a small width section 243a extending from a first side of a corresponding one of the spoke fixing parts 241 and a large width section 243b extending from a second side of the corresponding one of the spoke fixing parts 241, with a transition section 243c is formed between the small width section 243a and the large width section 243b. The dimensions of this embodiment are the same as the first embodiment, except as shown otherwise.

Fourth Embodiment

Referring now to FIGS. 11-13, a modified front hub 220 is illustrated in accordance with a fourth preferred embodiment. In view of the similarity between the fourth embodiment and the prior embodiments, the parts of the fourth embodiment that are identical to the parts of the prior embodiments will be given the same reference numerals as the parts of the prior embodiments. Moreover, the descriptions of the parts of the fourth embodiment that are identical to the parts of the prior embodiments may be omitted for the sake of brevity. In other words, unless otherwise specified, the configuration of the front wheel of the fourth embodiment is the same as the configuration of the first embodiment.

The front hub 320 is configured to be used with the spokes 21 and the rim 22 of the first embodiment. In this embodiment, the hub 320 has modified spoke fixing parts 341 with modified through holes 343 that receive modified spoke securing elements 333 to engage the threaded portions 21a of the spokes 21. The spoke fixing parts on other side of the hub 320 have the same arrangement. Thus, the only difference between the first and second embodiments is the shapes of the through holes 343 and the use of the modified spoke securing elements 333.

Similar to the first embodiment, the securing elements 333 are removably coupled to the spoke fixing parts 341 of mounting portions 332a (only one shown) of the hub shell 332. In particular, the securing elements 333 are dimensioned to be inserted axially into the through holes 343 of the spoke fixing parts 341. Thus, the through holes 343 includes a small width section 343a extending from a first side of a corresponding one of the spoke fixing parts 341 and a large width section 343b extending from a second side of the corresponding one of the spoke fixing parts 341, with a transition section 343c is formed between the small width section 343a and the large width section 343b. The dimensions of this embodiment are the same as the first embodiment, except as shown otherwise.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "member" or "element" when used in the singular can have the dual meaning of a single part or a plurality of parts. Also as used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle wheel component comprising:
   an axle;
   a hub shell rotatably disposed about the axle with a plurality of spoke fixing parts disposed at opposite ends of the hub shell, each of the spoke fixing parts including a through hole having a small width section extending from a first side of a corresponding one of the spoke fixing parts and a large width section extending from a second side of the corresponding one of the spoke fixing parts such that an internal abutment is formed between the small and large width sections; and
   a plurality of securing elements removably disposed in the large width sections of the spoke fixing parts of the hub shell with each of the securing elements having a threaded bore that is aligned with a corresponding one of the small width sections of the spoke fixing parts of the hub shell, each of the threaded bores having a transverse width substantially equal to a transverse width of the corresponding one of the small width sections,
   the securing elements being configured and arranged such that they do not extend into the small width sections of the spoke fixing parts.

2. The bicycle wheel component according to claim 1, wherein
   each of the spoke fixing parts includes two of the through holes that extend outwardly to form an exterior obtuse angle therebetween as measured between center axes of the through holes of each of the spoke fixing parts.

3. The bicycle wheel component according to claim 1, wherein
the spoke fixing parts of the hub shell are individual radial projections that are circumferentially spaced apart about opposite ends of the hub shell.

4. The bicycle wheel component according to claim 1, wherein
the large width sections of the through holes have a maximum width equal to about 3.50 millimeters or smaller.

5. The bicycle hub according to claim 4, wherein
the small width sections of the through holes have a maximum width in a range of 2.27 millimeters to 2.50 millimeters.

6. The bicycle hub according to claim 1, wherein
the small width sections of the through holes have a maximum width in a range of 2.27 millimeters to 2.50 millimeters.

7. The bicycle wheel component according to claim 1, wherein
the large width sections of the through holes have non-circular, transverse cross section shapes and the securing elements have an exterior mating cross section shape.

8. The bicycle wheel component according to claim 1, wherein
the large width sections of the through holes have circular, transverse cross section shapes and the securing elements have an exterior mating cross section shape.

9. The bicycle wheel component according to claim 1, further comprising
a plurality of spokes with each of the spokes including a threaded inner end portion threadedly coupled to one of the securing elements.

10. The bicycle wheel component according to claim 9, wherein
each of the spokes is a straight spoke including an outer headed ended portion.

11. A bicycle wheel comprising:
an annular rim;
a plurality of spokes having inner ends and outer ends with the outer ends fixedly coupled to the rim; and
a hub having an axle and a hub shell rotatably disposed about the axle, the hub shell having a plurality of spoke fixing parts and a plurality of removable securing elements coupling the inner ends of the spokes to the spoke fixing parts of the hub,
each of the spoke fixing parts including a through hole having a small width section extending from a first side of a corresponding one of the spoke fixing parts and a large width section extending from a second side of the corresponding one of the spoke fixing parts such that an internal abutment is formed between the small and large width sections, and
the securing elements being removably disposed in the large width sections of the spoke fixing parts of the hub shell with each of the securing elements having a threaded bore that is aligned with a corresponding one of the small width sections of the spoke fixing parts of the hub shell, each of the threaded bores having a transverse width substantially equal to a transverse width of the corresponding one of the small width sections.

12. The bicycle wheel according to claim 11, wherein
each of the spoke fixing parts includes two of the through holes that extend outwardly to form an exterior obtuse angle therebetween as measured between center axes of the through holes of each of the spoke fixing parts.

13. The bicycle wheel according to claim 11, wherein
the spoke fixing parts of the hub shell are individual radial projections that are circumferentially spaced apart about opposite ends of the hub shell.

14. The bicycle wheel according to claim 11, wherein
the large width sections of the through holes have a maximum width equal to about 3.50 millimeters or smaller.

15. The bicycle wheel according to claim 14, wherein
the small width sections of the through holes have a maximum width in a range of 2.27 millimeters to 2.50 millimeters.

16. The bicycle wheel according to claim 11, wherein
the small width sections of the through holes have a maximum width in a range of 2.27 millimeters to 2.50 millimeters.

17. The bicycle wheel according to claim 11, wherein
the large width sections of the through holes have non-circular, transverse cross section shapes and the securing elements have an exterior mating cross section shape.

18. The bicycle wheel according to claim 11, wherein
the large width sections of the through holes have circular, transverse cross section shapes and the securing elements have an exterior mating cross section shape.

19. The bicycle wheel according to claim 11, further comprising a plurality of adapters adjustably coupling the spokes to the rim.

20. The bicycle wheel according to claim 19, wherein
the spokes are straight spokes with each spoke including an outer headed end portion coupled to one of the adapters, the adapters being threadedly coupled to the rim.

* * * * *